Aug. 22, 1950 — S. S. KONIGSBERG — 2,519,668
INDICATING SYSTEM

Filed Sept. 4, 1944 — 2 Sheets-Sheet 2

INVENTOR.
SIDNEY S. KONIGSBERG
BY Charles O. Bruce
His attorney

Patented Aug. 22, 1950

2,519,668

UNITED STATES PATENT OFFICE 2,519,668

INDICATING SYSTEM

Sidney S. Konigsberg, San Francisco, Calif.

Application September 4, 1944, Serial No. 552,710

3 Claims. (Cl. 177—351)

My invention relates to indicating systems and more particularly to an electronic system for indicating a change in condition where such change in condition may be caused to manifest itself as a change in capacity or the like. While the system has many and varied applications, for purposes of disclosure a preferred form of the system will be described as adapted for the indication of liquid level or liquid volume as desired.

Among the objects of my invention are:

(1) To provide a novel and improved system for indicating a change in capacity;

(2) To provide a novel and improved system for indicating a change in capacity occurring at a distance from the system apparatus;

(3) To provide a novel and improved capacity indicating system of exceedingly flexible design and application;

(4) To provide a novel and improved capacity indicating system which readily lends itself to standardization;

(5) To provide a novel and improved system capable of indicating with a high degree of accuracy which increases as the indications approach a zero condition;

(6) To provide a novel and improved system of great stability, for indicating a change in capacity;

(7) To provide a novel and improved capacity indicating system embodying operational and accuracy checks;

(8) To provide a novel and improved system capable of indicating a change in level or volume of liquid in a container or tank, whether such container or tank be disposed in proximity to the indicating apparatus or at a substantial distance therefrom;

(9) To provide a novel and improved system for indicating a change in capacity, which system embodies tell-tale features, adapted, upon failure in the system, to indicate in which portion of such system the failure occurred;

(10) To provide a novel and improved system for indicating a change in level or volume of liquid in a container or tank, irrespective of whether such liquid be electrically conductive, non-conductive, or semi-conductive;

(11) To provide a novel and improved system adaptable for indicating a change in capacity either on a logarithmic scale or on a linear scale, or variations thereof;

(12) To provide a novel and improved system for indicating a change in level or volume of liquid in a container or tank, which system is adapted to be embodied in light-weight apparatus for use as a gasoline gauge on aircraft;

(13) To provide a novel and improved system for indicating a change in level or volume of liquid in a container or tank, which system is inherently safe in its application as a gasoline gauge on aircraft;

(14) To provide a novel and improved liquid level measuring system for aircraft whose accuracy is unimpaired by changes in attitude of the aircraft.

Additional objects of my invention will be brought out in the following description taken in conjunction with the accompanying drawings wherein—

Figure 1:
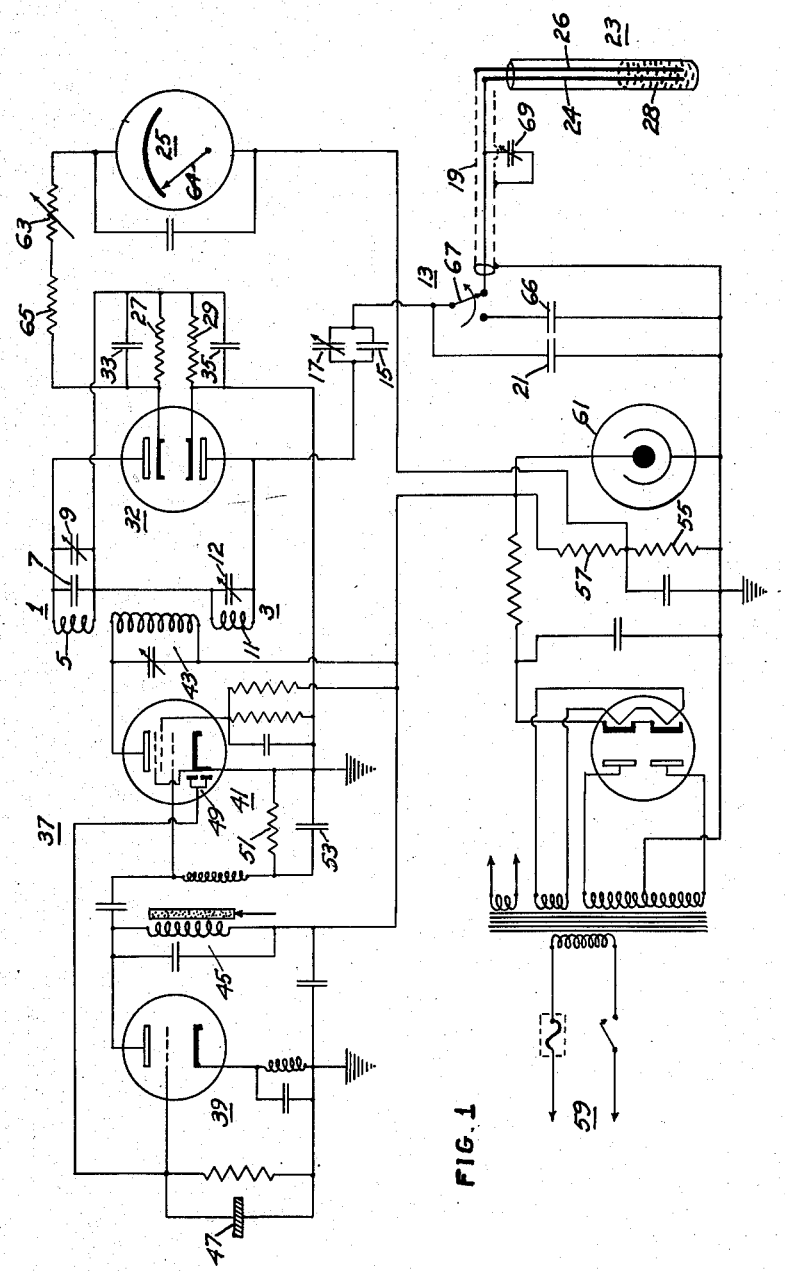
Figure 1 is a circuit diagram of my novel and improved system as adapted to the indication of a change in level or volume of liquid in a tank.

In general, my system utilizes a pair of resonant circuits, one of which includes the variable capacity to which the system is made responsive. This variable capacity is itself made responsive to such change in condition which it is desired to indicate on a suitable meter or other indicating means. The resonant circuits are initially adjusted to give a substantially balanced output in response to an impressed voltage of predetermined fixed amplitude and frequency, whereby any subsequent change in the variable capacity, produces an unbalance in the output of the two resonant circuits. The differential frequency so created becomes a measure of the extent of change in such variable capacity though it is the differential output of the tuned circuits which is the actual measure of such change, and this can be indicated on a suitable meter. The system embodies many features and refinements, all of which will be described in detail in connection with the following description of a preferred embodiment of my invention as illustrated in the drawings to which reference will now be made.

As previously stated, my system embodies a pair of resonant circuits 1 and 3, one of which comprises a coil 5 shunted by a fixed condenser 7 and a trimmer condenser 9 in parallel, while the other resonant circuit includes a coil 11 effectively shunted by a suitable condenser 12 and capacity network 13.

This capacity network includes a pair of parallel connected condensers 15 and 17, one of which is preferably variable, such parallel connected condensers being connected in series with the capacitance of a concentric cable 19 of fixed capacity, preferably shunted by a fixed condenser 21 and connecting with a variable capacity 23, the value of which under varying conditions is to be indicated on a suitable indicating means such as a meter 25.

Such variable capacity 23 may take the form of a probe including a pair of spaced electrodes 24, 26 adapted for insertion or mounting in a tank, wherein the liquid 28 will provide the dielectric whose level will change with change in volume of the liquid in the tank; or where the liquid, if electrically conductive, may constitute a plate of a condenser or may be employed to alter the dielectric of a condenser.

Each of the resonant circuits is connected across similar resistors 27, 29, respectively, through one-half of a double diode rectifier 32, with each resistor shunted by a by-pass condenser 33, 35, respectively. The by-pass condenser 35 associated with the second resonant circuit 3 completes the shunt connection of the capacity network 13 across the coil 11 of that resonant circuit.

The voltage developed across each resistor 27 and 29 is directly dependent upon the voltage developed in each associated resonant circuit from a source 37 of alternating current voltage coupled thereto, and this in turn is a function of both the magnitude of the impressed voltage and the resonant frequency of such resonant circuit with relationship to the frequency of the impressed voltage.

With the variable capacity 23 in a condition representing a starting point, for example, with the probe in an empty tank or completely removed therefrom, the resonant circuits 1 and 3 may be initially adjusted as to frequency, so as to be balanced with respect to the frequency of the voltage source 37. Thus they may both be tuned to the frequency of the voltage source or one resonant circuit may be tuned to a frequency slightly above that of the voltage source while the other will be tuned to a frequency slightly below the frequency of the voltage source by a corresponding amount.

Figure 2:
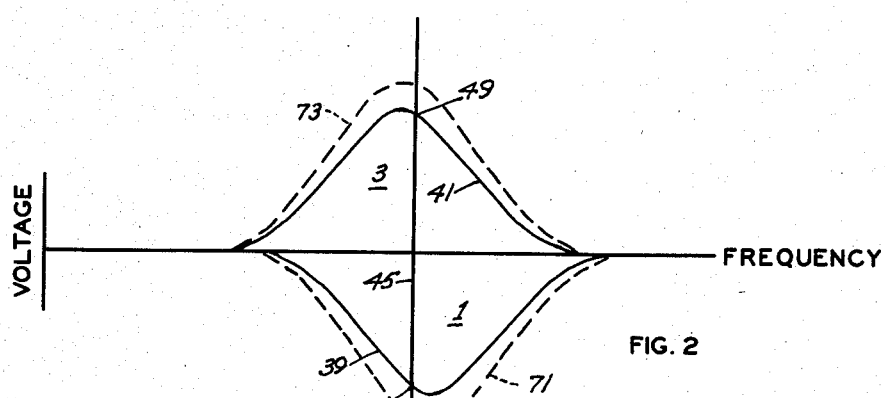
Figure 2 is a graph illustrating the preferred adjustment of the circuit of Figure 1.

The latter mode of adjustment has been illustrated in Figure 2. The curve 39 below the frequency axis represents the frequency response curve of one of the resonant circuits, in this instance, the resonant circuit 1. The other curve 41 represents the corresponding frequency response curve of the other resonant circuit, in this case, the resonant circuit 3 which includes the variable capacity or probe 23. The vertical line 45 which intersects both curves, represents the frequency of the voltage impressed upon the resonant circuits from the source 37, and the points 47 and 49 of intersection, represent, respectively, the magnitude or amplitude of the voltage induced in each of the resonant circuits 1 and 3, respectively.

Figure 3:
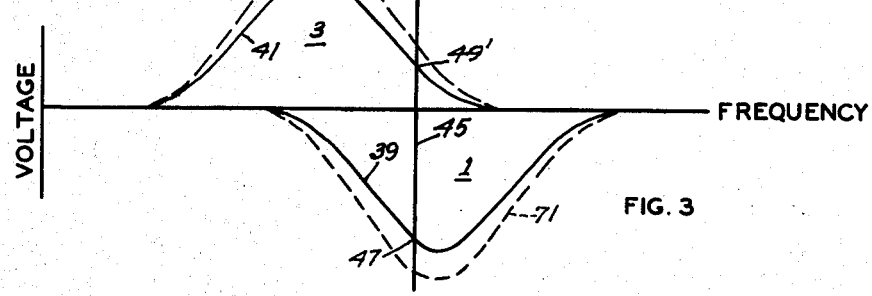
Figure 3 is a similar graph depicting the underlying principle of operation of the circuit of Figure 1.

When adjusted so that the resonant frequency of circuit 3 is at a frequency below the impressed voltage frequency by an amount exactly equal to the amount by which the frequency of circuit 1 is above the impressed voltage frequency, the induced voltages will balance out across the resistors 27 and 29. Any change in tuning of the resonant circuit 3, however, as by the variable capacity 23, will have the effect of shifting the frequency response curve of such resonant circuit with respect to the frequency of the voltage source 37 and, consequently, alter the output from such resonant circuit across its resistor 29. This is illustrated in Figure 3 wherein the curve 41 has been displaced from its original position, and the point 49' of intersection by the line 45 represents the magnitude of voltage induced into the resonant circuit 3 under such conditions. Thus the output of one resonant circuit will no longer balance the output of the other, and a measurable voltage will appear across the resistors 27 and 29, the value of which will be proportional to the frequency differential of the two resonant circuits.

The initial adjustment of the resonant circuits to either side of the frequency of the voltage source is preferred, in that it provides for operation along the straight line portion of the resonance frequency curve of the resonant circuit which includes the variable capacity to be measured, and accordingly no compensating factors are required to obtain a linear relationship between the frequency differential of the two resonant circuits 1 and 3 and the voltage appearing across the resistors 27 and 29.

Accuracy and dependability of the system requires that the voltage source 37 shall produce an output voltage which is fixed both in frequency and amplitude. Accordingly and with this purpose in mind, I provide a voltage source which includes an oscillator 39, preferably of the crystal controlled type employing a zero temperature coefficient crystal. The output of such oscillator is fed to the resonant circuits 1 and 3 through a saturating amplifier 41, to the tank circuit 43 of which, the resonant circuits 1 and 3 are coupled.

The particular type of crystal controlled oscillator relied on, is not critical, but for purposes of illustration, I have depicted a conventional type oscillator having a tuned plate circuit 45 with the crystal 47 in the grid or input circuit.

The amplifier may be designed around a tube which embodies a diode limiter 49. This might then be connected across the crystal 47 and when so connected will function to stabilize the crystal voltage. Thus the output of the oscillator would become similarly stabilized, whereby a voltage of substantially uniform peak value upon the input circuit of the amplifier could be assured.

The amplifier is self-biasing, by the inclusion in the input circuit, of a bias resistor 51 shunted by a condenser 53, this combination functioning to develop a bias voltage across the resistor in response to grid current drawn at the peak values of the impressed voltage.

The amplifier tube is operated at D.-C. plate and screen voltages sufficiently low as to result in saturation of the tube during the application of peak voltages to the grid of the tube.

Accordingly with the above design features embodied in the oscillator and amplifier, the output voltage of the amplifier as impressed upon the resonant circuits will be assured of a fixed frequency and amplitude, and which will be relatively unaffected by minor changes in line voltage.

Plate voltage for both the oscillator 39 and the amplifier 41 is developed across a potentiometer or a pair of series connected resistors 55 and 57 by any conventional method, as by rectifying and filtering the voltage from an alternating current source 59, or by connection to a direct current generator, or by applying batteries directly across such resistors. A voltage regulator tube 61 across these resistors provides for stabilizing such voltage and thereby serves to preclude wide variations in the applied plate and screen voltage which might conceivably have a disturbing effect on the amplitude of the amplifier output voltage.

The voltage developed across the output resistors 27 and 29 of the resonant circuits is preferably applied across the indicating meter 25 through a variable voltage dropping resistor 63 which permits of adjusting the maximum reading position of the needle 64 on the meter. Where necessary, a fixed voltage dropping resistor 65 may be included in series with the variable resistor.

Rather than connect the output voltage of the resonant circuits exclusively across the meter, I prefer to introduce a direct current biasing voltage in series with the output voltage of the resonant circuits. Such voltage may be derived from across the power supply output resistor 55 which is preferably of the variable type to provide for accurate adjustment of the meter needle to its desired biased position. This voltage will cause a zero indication on the meter to occur at some intermediate position of the needle; that is when the two resonant circuits are adjusted to give a desired zero reading. When so biased, the meter, in addition to indicating on a suitable scale, changes in the variable capacity 23 to be measured, will also then be adapted to inform an operator in the event of failure of the power supply. This is made possible by the fact that upon the occasion of such failure, the meter needle will swing to the power-off position of the needle which would be below the zero indication on the meter. Thus the zero reading on the scale and the power-off position of the needle are distinguishable.

While the meter bias voltage may be adjusted to bring the meter needle exactly to the zero marking on the meter dial, I contemplate and prefer biasing the meter to a needle position 68 (Figure 4), slightly below the zero indication on the meter dial, and then slightly unbalance the resonant circuits 1 and 3 sufficiently to bring the meter needle to the zero indicating position.

When so adjusted, any failure occurring in the system which would preclude the development of a voltage across the resonant circuit output resistors 27 and 29, will manifest itself in a drop in position of the meter needle from a normal scale reading to the position 68 of the needle as determined by the direct current biasing voltage applied to the meter.

The degree of unbalance, however, might be so slight that the resonant circuits 1 and 3 could still be considered as being in substantial frequency balance, in their initially adjusted condition with respect to the voltage source 37, and when the expression "substantial balance" or an equivalent expression is employed in connection therewith in the claims, it is to be so interpreted.

These tell-tale features are of considerable importance as where the system is installed in aircraft for indicating liquid level or volume of gas in a gas tank, for were the meter to be connected directly across the output resistors of the resonant circuits, a zero reading of the meter would not distinguish between an empty tank or a failure in the circuit, and a pilot would have no way of differentiating to determine the true meaning of the zero indication on the meter.

Figure 4:
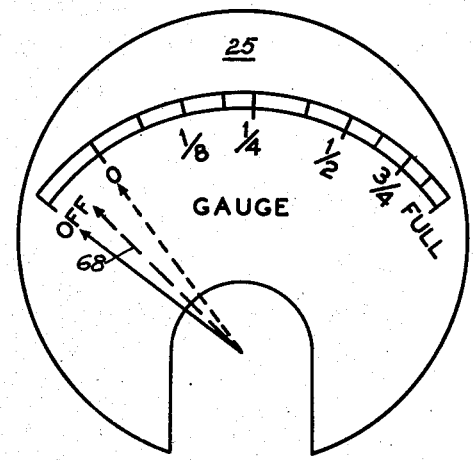
Figure 4 is a view of a meter dial illustrating certain tell-tale features embodied in the circuit of Figure 1.

On the other hand, with the meter connected in circuit with a biasing voltage and with the resonant circuits slightly unbalanced so as to bring the meter needle to the zero position as previously described, and illustrated in Figure 4, the zero reading on the meter can only mean an empty tank; and upon failure of the circuit, whether in the power supply or in the remaining portion, an operator will be informed as to which portion of the circuit the failure has occurred.

A quick overall test of the system up to the cable may be had by substituting a condenser 66 for the cable and probe, the value of the condenser to be equal to the combined value of the cable and probe in its empty tank condition. A switch 67 preferably of the push-button type may be relied on to accomplish such substitution.

An added tell-tale feature is the condenser 21 across the concentric cable. Its value is such that upon accidental disconnection or break in the external circuit, an off-scale reading on the meter at the high end of the scale will result.

An important feature of the system resides in the fact that the cable 19 constitutes an element of one of the resonant circuits and, therefore, no necessity exists for balancing out the capacity of the cable, as is essential in prior attempts in systems requiring a cable.

Different installations will, of course, require concentric cables of different lengths, and, in order to facilitate the utilization of cables of different lengths, without upsetting the design constants of the rest of the system, I contemplate the provision of a variable condenser 69 which in practice will be connected across a length of cable emerging from the system, and from this condenser will be connected the additional length of cable necessary for a particular installation. The effective capacity of the cable may then be adjusted by means of this condenser to a predetermined value necessary to give the desired resonant frequency to the resonant circuit of which it forms a part. Thus the system itself up to this point may be more or less standardized for any one of a large range of installations. For aircraft use, this is of particular significance, in that the length of cable necessary in such installations will vary considerably depending on the wingspread of the plane.

Another feature of my invention which is of substantial importance in connection with the measurement of gasoline in gas tanks of moving vehicles and particularly in aircraft, is the incorporation of the parallel connected condensers 15 and 17 in the tuned circuit 3 which includes the variable capacity or probe 23. These condensers enable one to alter the relationship between the variation in capacity of the probe 23 and the movement of the meter needle 64. In one extreme setting of these condensers, the meter needle may be caused to move as a linear function of the variation in the capacity of the probe, whereas in the other extreme adjustment of these condensers, this relationship may be changed from the linear function to a type of logarithmic function, and for intermediate adjustments of these condensers, the relationship will represent an intermediate relationship.

When adjusted for measurement on the logarithmic basis, as indicated in Figure 4, the lower or zero end of the meter scale will have widely spaced indications and these will gradually crowd up toward the end of the scale which indicates a full gas tank. Inasmuch as the pilot's concern over his fuel supply increases as the supply diminishes, the desirability that the meter read with greater clarity and exactness in the direction of an empty tank, becomes more or less obvious.

In this connection also, it is of interest to note that the system inherently registers increasing insensitivity to undesired line voltage or other voltage level shifts, as the resonant circuits approach a balance, representative of an empty tank condition. This is explainable, with reference to Figures 2 and 3, by the fact that any change in the drive voltage, will alter the height of each of the resonant curves. The change would be greatest at the peak and gradually diminish down the slopes as illustrated by the dotted curves 71 and 73. With the curves widely displaced as in Figure 3, the changes are only partially balanced out. However, as the curves approach their zero reading or empty tank positions as depicted in Figure 2, the difference becomes less and less until the changes balance out or neutralize each other.

This phenomenon also renders the resonant circuits in their zero reading condition, insensitive to manipulations of the meter adjusting resistor 63, thus enabling independent adjustment of the resonant circuits 1, 3 and the resistor 63, the former for zero scale reading and the latter for maximum scale reading.

Other uses of the system may make a linear scale on the meter desirable and, as pointed out, this can be arranged through an adjustment of the condensers 15, 17.

By making other adjustments in the circuit, various additional types of meter response characteristics can be worked out to satisfy other conditions.

Up to this point, nothing has been said regarding the sharpness of tuning of the resonant circuits 1 and 3. The system will function regardless of the degree of sharpness to which these circuits are tuned, but I have found certain very definite advantages to exist in designing these circuits as low Q circuits, that is to have reasonably broad tuning. This not only simplifies the design and manufacture of the resonant circuit elements including the cable and probe, but also eliminates the necessity for critical adjustments in setting up the system for operation, and otherwise stabilizes the operation of the entire system.

Partial open circuit up to 40 ohms in series with the cable has negligible effect on the meter reading, and partial short circuit of the cable as low as 2500 ohms, also has negligible effect on the meter, thus demonstrating the stable character of the system, yet leaving the system very sensitive to the changing condition which it is designed to measure.

The above described system is inherently safe in its application to situations such as the measurement of level or volume of gas in a gas tank, as it is impossible for a spark to occur in the probe circuit; for not only is the voltage across the probe elements so small as to be incapable of producing a spark under normal existing conditions, but any tendency for a short to occur, will detune the resonant circuit still further away from the frequency of the voltage source and thereby diminish the probe voltage to a value approaching zero voltage.

From the above description of a preferred embodiment of my invention, it will be apparent that the same fulfills all the objects of my invention as previously set forth, and that the system is exceedingly flexible in the matter of design and adjustments to adapt it to many and varied applications.

Results along the lines indicated in the foregoing description may be realized through a number of modifications of the circuit without departing from the fundamental underlying principles. Thus, the resonant circuit 3 exclusive of resonant circuit 1, may be relied on in combination with the voltage source 37 to produce the meter readings, or the cable and probe might be included in a voltage source of adjustable frequency type in which case the resonant circuits would both be adjusted to fixed frequencies. Fundamentally, it is the relative shifting of the frequency of the voltage source with respect to the resonant circuits in response to a changing condition which underlies the present invention, though the preferred embodiment described has its advantages.

Accordingly, while I have disclosed and described such preferred embodiment in considerable detail, I do not desire to be limited in my protection to such details, except as may be necessitated by the appended claims.

I claim:

1. An indicating system for indicating a change in condition of apparatus, comprising a source of voltage at a predetermined frequency, a resonant circuit coupled to said source as a load and tuned to a frequency to one side of the frequency of said source, a second resonant circuit coupled to said source as a load and tunable through a frequency on the other side of the frequency of said source, said latter resonant circuit including a cable and a variable capacity determinable by such change in condition, indicating means responsive to changes in the overall load of said resonant circuits as caused by such change in condition, said indicating means including a meter connected across said resonant circuits in opposition, and having a zero indication thereon, a bias voltage source in series with said meter and of a value to bias the indicating element of said meter to a position slightly short of said zero indication, said resonant circuits being in substantial through not accurate balance, the extent of unbalance being sufficient to bring said indicating element to said zero indication.

2. In an indicating system for indicating a change in a variable capacity and requiring a cable for connection to said variable capacity, said cable and variable capacity constituting an external circuit, indicating means responsive to a change in said variable capacity for indicating such change, said indicating means including a meter having a scale thereon, and means in said system responsive to a break in said external circuit for causing said meter to read above maximum operating range.

3. In an indicating system for indicating a change in a variable capacity and requiring a cable for connection to said variable capacity, said cable and variable capacity constituting an external circuit, indicating means responsive to a change in said variable capacity for indicating such change, said indicating means including a meter having a scale thereon, and means in said system responsive to a break in said external circuit for causing said meter to read off-scale.

SIDNEY S. KONIGSBERG.

REFERENCES CITED

The following references are of record in the file of this patent:

UNITED STATES PATENTS

| Number | Name | Date |
|---|---|---|
| 1,432,346 | Lorenz | Oct. 17, 1922 |
| 1,794,932 | Usselman | Mar. 3, 1931 |
| 1,824,745 | Allen | Sept. 22, 1931 |
| 1,849,870 | Fitzgerald | Mar. 15, 1932 |
| 2,167,630 | Bazzoni | Aug. 1, 1939 |
| 2,200,863 | Schuck | May 14, 1940 |
| 2,267,453 | Foster | Dec. 23, 1941 |
| 2,300,562 | Freystedt | Nov. 3, 1942 |
| 2,354,964 | Ostermann et al. | Aug. 1, 1944 |
| 2,357,023 | Reid et al. | Aug. 29, 1944 |
| 2,374,265 | Baker et al. | Apr. 24, 1945 |
| 2,375,084 | Coroniti et al. | May 1, 1945 |

FOREIGN PATENTS

| Number | Country | Date |
|---|---|---|
| 158,056 | Austria | Mar. 11, 1940 |
| 481,103 | Great Britain | Feb. 28, 1938 |